Patented Mar. 13, 1934

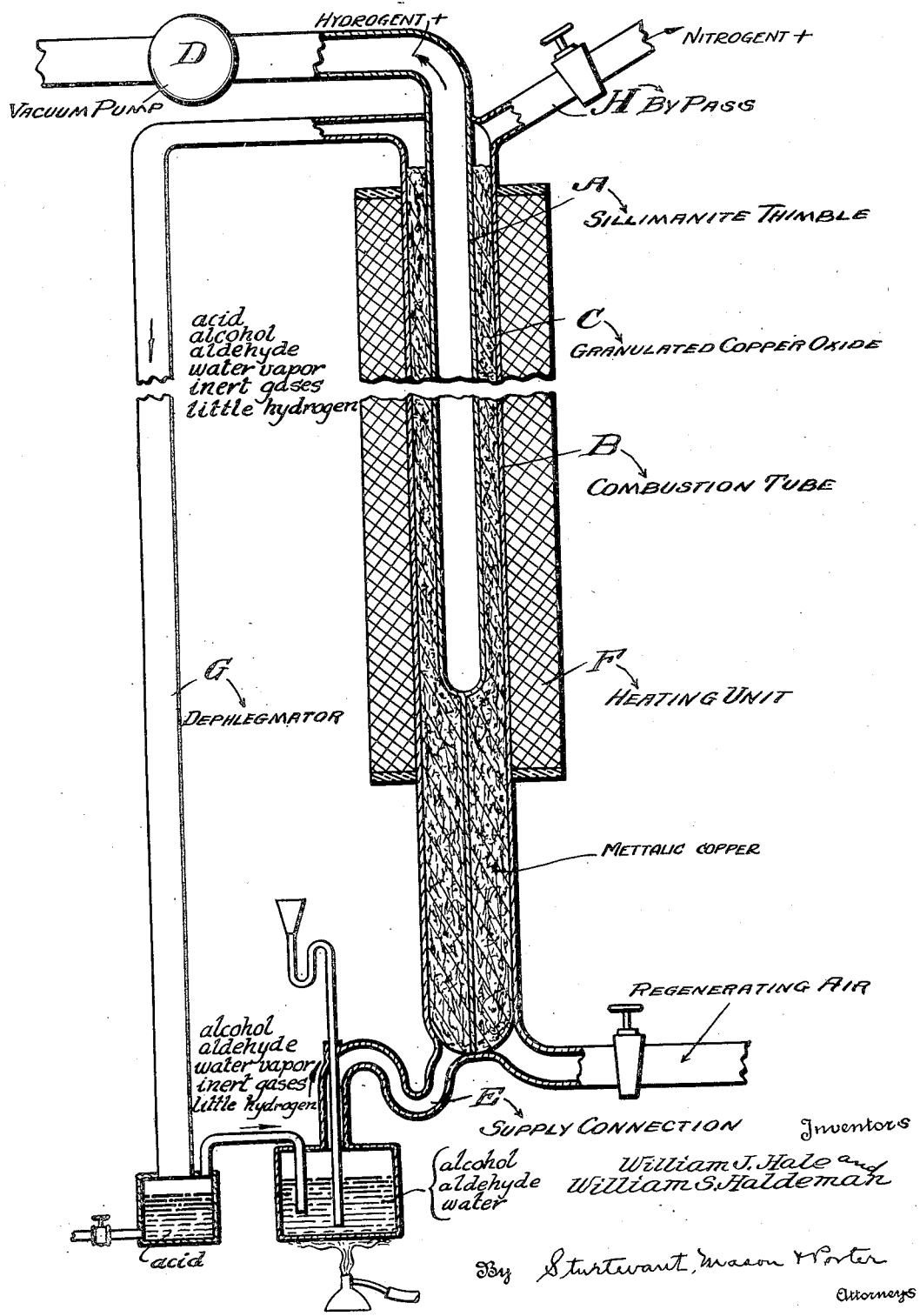

1,951,280

UNITED STATES PATENT OFFICE 1,951,280

CYCLIC OXIDATION OF ALCOHOLS TO FORM ALIPHATIC ACIDS

William J. Hale, Midland, Mich., and William S. Haldeman, Monmouth, Ill.

Application October 3, 1931, Serial No. 566,802

9 Claims. (Cl. 260—116)

The present invention concerns an improved method for preparing an aliphatic acid whereby an aliphatic alcohol is dehydrogenated to form the corresponding aldehyde and the latter is oxidized to form the desired acid, said reactions being conducted conjointly and in such a way as to avoid the presence of hydrogen in high concentration during the period in which said reactions occur.

In the drawing, the figure is a diagrammatic illustration of one form of apparatus for carrying out the method.

In our co-pending application, Serial No. 284,271, filed June 9, 1928, we have described a process whereby a gaseous mixture comprising an aqueous alcohol and its corresponding aldehyde is passed, at a temperature between 150 and 350 degrees C., first into contact with a catalyst capable of promoting the dehydrogenation of alcohol to form an additional quantity of such aldehyde and then passing the mixed gases (now containing hydrogen) at the aforementioned temperature into contact with an agent capable of oxidizing part of the aldehyde to the corresponding acid and part of the hydrogen to water. The acid so produced is removed from the mixed products through fractional condensation and the remaining gaseous mixture is returned to the system for re-employment. In the above mentioned co-pending application, it is pointed out that the presence of the hydrogen produced during the step of dehydrogenating alcohol is advantageous in that it inhibits greatly the tendency of the acid product to split out carbon dioxide under conditions maintained during the reaction period, and thereby reduces considerably the loss of materials through such decomposition.

In producing an acid according to the procedure such as described in our co-pending application, at least two of the reactions involved are of the reversible type, viz:—

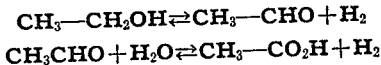

$$CH_3—CH_2OH \rightleftarrows CH_3—CHO + H_2$$

$$CH_3CHO + H_2O \rightleftarrows CH_3—CO_2H + H_2$$

While it is true that the presence of hydrogen protects the acid product against decomposition, yet, from the above equations it may readily be seen that the presence of hydrogen, in excess of that quantity required to ensure the aforementioned protective action, is disadvantageous both in that its presence inhibits the dehydrogenation of alcohol to form the intermediate aldehyde product and in that said hydrogen tends to reduce the desired acid product back to the intermediate aldehyde stage. The presence of hydrogen in excess of the amount required for successful operation is further disadvantageous in that hydrogen tends to reduce the oxidizing agent employed for the conversion of aldehyde to acid and thereby quickly and materially lessens the quantity of said oxidizing agent available to the other reactants involved.

We have now found that hydrogen may be present in materially lower concentration than that produced through dehydrogenating alcohol according to the method described in co-pending application, Serial No. 284,271, and still substantially prevent the undesirable decomposition of the acid product, and that we can remove a large portion of the hydrogen by-product, substantially as it is formed and as the nearly pure element, thereby making possible the production of nearly pure hydrogen as a by-product and the production of the desired acid in a yield appreciably higher than is possible when such acid is prepared from the corresponding alcohol according to procedure described in our aforementioned co-pending application.

To the accomplishment of the foregoing and related ends, the invention, then, consists in an improved method for oxidizing a lower primary aliphatic alcohol to the corresponding acid, of which an illustrative form is hereinafter described, but it will be understood that this illustration sets forth in detail merely one mode of carrying out the invention, and that the invention may be practiced in other manners. Such a lower primary aliphatic alcohol, according to the present invention, is characterized in that it may be evaporated below 350° C., so that the procedure occurs in the vapor.

In operating according to our improved mode of procedure, a lower primary alcohol which may or may not contain up to about 30 per cent by weight of water and/or the aldehyde corresponding to that obtainable through oxidation of the alcohol, is passed into a tube having walls permeable to hydrogen and presenting both a catalyst capable of promoting the dehydrogenation of alcohol as for example copper, silver, gold and/or mercury or oxides thereof which are hereinafter denominated "dehydrogenating catalysts"; and an agent capable of oxidizing an aldehyde to the corresponding acid as for example oxide of silver, copper, or a near noble metal, or mixtures thereof. The tube is maintained at any temperature between 150 and 350 degrees C., but preferably at a temperature between 250 and 320 degrees C., during passage of gases therethrough. The above mentioned tube itself may be made of a material such as palladium, platinum, nickel, wrought iron, or various alloys, or of aluminum oxide, sillimanite, or partially fused earthy materials in general, the only practical restriction with respect to the composition of such tube being that the walls of the same must be permeable to hydrogen but practically impermeable to all other components of the reaction mixture under the conditions at which the reaction is carried out.

In practicing our invention, we prefer to employ a double-tubular reactor, i. e., a reactor comprising a small tube inside of a larger one. The outer of these tubes presents a surface practically impermeable to hydrogen, as for example, glass, copper, brass, high chromium steel, enameled steel, etc.; and the inner tubes present a surface and composition relatively permeable to hydrogen as set forth above. The space between the inner and outer tubes of the reactor is filled with a metal oxide or an inert substance carrying the same.

During operation, the desired gaseous reactants are passed, preferably under super-atmospheric pressure, into and through the annular space between the inner and outer tubes of the reactor, and a sub-atmospheric pressure is at the same time maintained within the inner tube so as to facilitate withdrawal of hydrogen from the reaction mixture substantially as it is formed. When operating according to the procedure described above, in an initial phase, the gaseous alcohol first comes into contact with, for example, copper oxide at a temperature between 150 and 350 degrees C. The copper oxide is reduced, at the point of contact with alcohol, to the free metal, and hydrogen is split from the alcohol to form water, the alcohol itself being thereby converted to the corresponding aldehyde. The metallic copper, formed during the first few minutes or initial phase of operation, is in itself an excellent dehydrogenating catalyst and promotes the splitting of free hydrogen from the fresh quantities of alcohol passed into the apparatus. The hydrogen, as it is split from the alcohol, passes to a large extent, from the reaction mixture through the wall of the inner tube of the reactor substantially as it is formed. The aldehyde, formed through such dehydrogenation of alcohol, comes into immediate contact with fresh quantities of copper oxide and is to a large extent oxidized by the latter to the corresponding aliphatic acid which passes from the annular space of the reactor intermixed with some aldehyde and very small portions of hydrogen and unreacted alcohol, as well as with any inert gaseous materials which may have been employed along with the reactants themselves. The reacted mixture, after passing from the reactor, is dephlegmated so as to separate the acid product therefrom and the remaining gaseous mixture is replenished with alcohol vapor and returned to the reactor for re-employment. Through operating in this cyclic manner, nearly all of the alcohol is eventually converted to the corresponding acid and nearly pure hydrogen is obtained as a by-product.

In operating according to the above described procedure, we prefer to control the relative rates at which the gaseous reactants are passed through the reactor, and at which hydrogen is withdrawn from the reaction mixture, so that the mixture at all times contains sufficient hydrogen to substantially prevent decomposition of the acid produced. The exact quantity of hydrogen required for such purpose is dependent upon a number of factors, important among which are the rate at which gaseous reactants are passed through the reactor, and the exact temperature at which said reactor is maintained during such passage. We have found, however, that under convenient operating conditions, the quantity of hydrogen in the mixed gaseous products which issue from the reactor need not exceed 5 per cent of the total volume of the mixture to afford the acid product almost complete protection against decomposition.

After continued operation with a given reactor in the above described manner, the metal oxide, employed as an agent for oxidizing the aldehyde to its corresponding acid, becomes largely reduced to the free metal and must be reconverted to the metal oxide before continuing the acid forming operations. This may be accomplished readily by passing a current of air through the reaction chamber at a temperature which will permit oxidation of the metal. For instance, when copper is the metal concerned, it may be reconverted to its oxide by passing air over the granules of the metal at 270 to 320 degrees C. and the copper oxide formed under such conditions is an especially active oxidizing agent for the conversion of aldehydes to acids. It is desirable in certain instances to mix the entering vapors with inert gases such as nitrogen.

The following examples describe two of the various ways in which the principle of our invention may be employed. It is to be understood, however, that such examples are purely illustrative and are not to be construed as a limitation on the invention. In describing the examples, reference will be made to the apparatus diagrammatically illustrated in the accompanying drawing.

*Example 1*

A slender sillimanite thimble A was inserted, to a depth of about 20 inches, into an ordinary glass combustion tube B, about 36 inches in length and 0.75 inch in diameter. The annular space within the combustion tube and about the inserted thimble was filled with granulated copper oxide C, the open end of the sillimanite thimble was connected with a vacuum pump D, and the combustion tube itself was fitted with connections E which would permit the passage of gases through the combustion tube and about the porous thimble. The combustion tube was then heated by a suitable heating unit F to about 310 degrees C., the sillimanite thimble was evacuated by means of the continuously operating pump, and the vapor from 85 per cent ethyl alcohol was passed, at the rate of about 110 gms. of 85 per cent alcohol vapor in 20 to 30 minutes, through the annular space filled with copper oxide. It was observed that this oxide was reduced to metallic copper at the end of the tube at which the alcohol vapors were admitted into the reactor and that, as the operation was continued, such transformation of copper oxide to the free metal extended itself gradually throughout the length of the tube. The vapors issuing from the reaction chamber were passed through a dephlegmator G and dephlegmated so as to separate most of the acetic acid produced, and the gaseous mixture remaining after such separation was replenished with additional vapor from 85 per cent ethyl alcohol and was again passed through the annular reaction chamber. By continuously operating our cyclic process over a period of about seven hours (with intermittent interruptions for the regeneration of copper oxide through passing air at 270 to 320 degrees C., instead of the alcoholic mixture, through the annular reaction chamber), we obtained a 75 to 80 per cent solution of acetic acid in quantity representing a yield of approximately 93 per cent of that theoretically obtainable from the quantity of alcohol employed, and approximately 65 per cent of the hydrogen theoretically liberated through dehydrogenation of the quantity of alcohol. The hydrogen recovered was about 90 per cent pure.

Along with the above-mentioned desirable products we obtained a small amount of ethyl acetate, and small amounts of carbon dioxide, and both saturated and unsaturated hydrocarbons.

*Example 2*

Through operating in a manner similar to that described in Example 1, a vaporized normal propyl alcohol solution of 85 per cent concentration was found to give normal propionic acid of about the same concentration. The optimum temperature for the dehydrogenation of normal propyl alcohol was found to be 10 to 15 degrees higher than that desirable for ethyl alcohol. The proportion of propyl aldehyde to the propionic acid product was approximately 1 to 4, and such aldehyde and other incandescent vapors, as in Example 1, were returned to the system along with incoming vapors of fresh normal propyl alcohol. The overall yield of normal propionic acid from normal propyl alcohol amounted, on an average, to approximately 91 per cent of theoretical. The production of carbon dioxide and hydrocarbon gases did not exceed 4 per cent of theoretical.

In operating according to the manner described in Example 1, we find that the water content of the mixed intermediate materials gradually tends to build up, and that after seven hours of such cyclic operation it becomes advisable to remove most of such water from said intermediate products before continuing operations. This may be done through fractional distillation, drying with a suitable agent, etc. Also, we find it advantageous to employ a highly cooled by-pass H through which nitrogen (which has entered during regeneration, or which is being introduced as inert gas), may escape from the vaporized intermediate products before recycling the latter through the system. Such by-pass is suitably attached to the top of a vertical condenser and consists of a flap-valve which will permit gas to escape slowly from the system but will not permit admittance of air to the same.

The principle of our invention may be employed in ways other than those previously mentioned. We may, for instance, employ a triple tube reactor, that is, a reactor having a relatively large impervious outer tube with a smaller intermediate one inside, and a still smaller inner tube within the intermediate tube. The intermediate tube mentioned has walls porous to hydrogen but not to the other materials employed or formed during the reaction; the inner tube has walls impervious to hydrogen and the annular space between the inner and intermediate tubes is filled with metal oxide (e. g. copper oxide) and constitutes the reaction chamber. Through the inner tube is circulated a liquid maintained at any temperature desired. Gaseous hydrogen is withdrawn from the annular space between the outer and intermediate tubes by a suction pump. By employing such apparatus, excellent temperature control may be maintained with very little heat loss. Again, a battery of reactors may be connected to a single dephlegmator and a single source of alcohol vapor, with control valves at the inlets and outlets, so that the production of acid may proceed in one or more tubes while regeneration of the oxidizing agent is occurring in other tubes. The control valves may be arranged so as to alternately pass air and the desired reaction mixture through the various reaction chambers as required for most efficient operation.

It is obvious that other modes of applying the principle of our invention may be employed instead of those explained, without departing from the scope of the appended claims, provided the step or steps stated by any of the following claims or the equivalent of such stated step or steps be employed.

We claim:

1. A cyclic method of converting a lower primary aliphatic alcohol to the corresponding aliphatic acid which comprises passing the alcohol in vapor form, at a temperature between 150 and 350 degrees C., over a dehydrogenating catalyst to form the corresponding aldehyde and free hydrogen, bringing the reaction mixture into contact with a material permeable to hydrogen whereby to separate part of the hydrogen from the reaction mixture substantially as it is formed, contacting the aldehyde-containing vapors, at a temperature between 150 and 350 degrees C., with a readily reducible metal oxide so as to oxidize such aldehyde to the corresponding aliphatic acid and a portion of the free hydrogen to water, separating said acid from the mixed products, replenishing the remaining mixed products with a fresh quantity of vapor of the said alcohol, and recycling the resultant mixture through the steps described above.

2. A cyclic method of converting a lower primary aliphatic alcohol to the corresponding aliphatic acid which comprises passing the vaporized alcohol, at a temperature between 150 and 350 degrees C., over a readily reducible metal oxide, to form the aldehyde corresponding to the alcohol, water, free hydrogen, and free metal from the metal oxide bringing the reaction mixture into contact with a material permeable to hydrogen whereby to separate part of the hydrogen from the reaction mixture substantially as it is formed, contacting the aldehyde-containing vapors immediately as said aldehyde is formed with additional metal oxide at a temperature between 150 and 350 degrees C. so as to oxidize said aldehyde to the corresponding aliphatic acid, separating the acid from the mixed products, replenishing the remaining mixed products with a fresh quantity of vapor of the said alcohol, and recycling the resultant mixture through the steps described above.

3. A cyclic method of converting a lower primary aliphatic alcohol to the corresponding aliphatic acid which comprises passing the vaporized alcohol, at a rate such that hydrogen is retained in the mixed reaction products and at a temperature between 250 and 320 degrees C., over copper oxide and copper to form the aldehyde corresponding to the alcohol employed, water, free hydrogen, and free copper. bringing the reaction mixture into contact with a material permeable to hydrogen whereby to separate part of the hydrogen from the reaction mixture substantially as it is formed, contacting the aldehyde-containing vapors immediately as said aldehyde is formed with additional copper oxide at a temperature between 250 and 320 degrees C. whereby to oxidize said aldehyde to the corresponding aliphatic acid and a portion of the hydrogen to water, separating the acid from the mixed products, replenishing the remaining mixed products with a fresh quantity of vapor of the said alcohol, recycling the resultant mixture through the steps described above, and interrupting the recycling from time to time and passing air through the mass of copper and copper oxide at a temperature of approximately 270 degrees C., whereby to regenerate the copper oxide.

4. A cyclic method of converting ethyl alcohol to acetic acid which comprises passing the vaporized alcohol, at a rate such that hydrogen is retained in the mixed reaction products and at a temperature between 150 and 350 degrees C., over copper oxide and copper to form acetaldehyde, water, free hydrogen, and free copper, bringing the reaction mixture into contact with a material permeable to hydrogen whereby to separate part of the hydrogen from the reaction mixture substantially as it is formed, contacting the aldehyde-containing vapor immediately as said aldehyde is formed and at a temperature between 150 and 350 degrees C., with additional copper oxide whereby to oxidize said aldehyde to acetic acid, and a portion of the free hydrogen to water, separating the acid from the mixed reaction products, replenishing the remaining mixed products with a fresh quantity of ethyl alcohol vapor, and recycling the resultant mixture through the steps described above.

5. A cyclic method of converting ethyl alcohol to acetic acid which comprises passing the vaporized alcohol along with water vapor in a proportion not exceeding 30 per cent by weight, at a rate such that hydrogen is retained in the mixed reaction products and at a temperature between 250 and 320 degrees C., over copper oxide, whereby to form free copper and a reaction mixture containing acetaldehyde, water and free hydrogen, bringing the reaction mixture into contact with a material permeable to hydrogen whereby to separate part of the hydrogen from the reaction mixture substantially as it is formed, contacting the aldehyde-containing vapors immediately as said aldehyde is formed and at a temperature between 250 and 320 degrees C., with additional copper oxide whereby to oxidize said aldehyde to acetic acid and a portion of the remaining hydrogen to water, separating the acid from the mixed reaction products, replenishing the remaining mixed products with a fresh quantity of vapor of ethyl alcohol; recycling the resultant mixture through the steps described above; and interrupting the recycling from time to time and passing air through the mass of copper and copper oxide at a temperature of 270 to 320 degrees C., whereby to regenerate the copper oxide.

6. A cyclic method of converting propyl alcohol to propionic acid, which comprises passing the vaporized alcohol, at a rate such that hydrogen is retained in the mixed reaction products and at a temperature between 150 and 350 degrees C., over copper oxide to form propionic aldehyde, water, hydrogen, and some free copper, bringing the reaction mixture into contact with a material permeable to hydrogen whereby to separate part of the hydrogen from the reaction mixture substantially as it is formed, contacting the aldehyde-containing vapors immediately as said aldehyde is formed and at a temperature between 150 and 350 degrees C., with additional copper oxide whereby to oxidize said aldehyde to acetic acid, separating the latter from the mixed reaction products, replenishing the remaining mixed products with a fresh quantity of vapor of propyl alcohol, and recycling the resultant mixture through the steps described above.

7. A cyclic method of converting propyl alcohol to propionic acid which comprises passing the vaporized alcohol along with water vapor in a proportion not exceeding 30 per cent by weight, at a rate such that hydrogen is retained in the mixed reaction products and at a temperature between 250 and 320 degrees C., over copper oxide to form propionic aldehyde, water, free hydrogen, and free copper, bringing the reaction mixture into contact with a material permeable to hydrogen whereby to separate part of the hydrogen from the reaction mixture substantially as it is formed, contacting the aldehyde-containing vapors immediately as said aldehyde is formed and at a temperature between 250 and 320 degrees C., with additional copper oxide, whereby to oxidize said aldehyde to propionic acid, separating the acid from the mixed reaction products, replenishing the remaining mixed products with a fresh quantity of vapor of propyl alcohol, recycling the resultant mixture through the steps described above, and interrupting the recycling from time to time and passing air through the mass of copper and copper oxide at a temperature of 270 to 320 degrees C., whereby to regenerate the copper oxide.

8. In a cyclic method of converting a lower primary aliphatic alcohol to the corresponding aliphatic acid, the steps which consist in passing a gaseous mixture containing the alcohol and the corresponding aliphatic aldehyde first over metallic copper at a temperature between 150 and 350 degrees C., whereby hydrogen is split from the alcohol and an additional quantity of the said aldehyde is formed thereby, bringing the reaction mixture into contact with a material permeable to hydrogen whereby to separate part of the oxygen from the reaction mixture substantially as it is formed, then passing the aldehyde-containing vapors over copper oxide at the said temperature and immediately as such aldehyde is being formed whereby part of said aldehyde is oxidized by the copper oxide to the corresponding aliphatic acid, separating the acid from the mixed reaction products, replenishing the remaining mixed products with a fresh quantity of vapor of the said alcohol, and recycling the resultant mixture through the steps described above.

9. In a cyclic method of converting a lower primary aliphatic alcohol to the corresponding aliphatic acid, the steps which consist in passing a gaseous mixture containing the alcohol and the corresponding aliphatic aldehyde, at a rate such that hydrogen is retained in the mixed reaction products, first over metallic copper at a temperature between 250 and 320 degrees C., whereby hydrogen is split from the alcohol and an additional quantity of the said aldehyde is formed, bringing the reaction mixture into contact with a material permeable to hydrogen whereby to separate part of the hydrogen from the reaction mixture substantially as it is formed, then passing the aldehyde-containing vapors over copper oxide at the aforementioned temperature and immediately as such aldehyde is being formed whereby part of said aldehyde is oxidized by the copper oxide to the corresponding aliphatic acid, separating the acid from the mixed reaction products, replenishing the remaining mixed products with a fresh quantity of vapor of the said alcohol, and recycling the resultant mixture through the steps described above.

WILLIAM J. HALE.
WILLIAM S. HALDEMAN.

CERTIFICATE OF CORRECTION.

Patent No. 1,951,280.                                                   March 13, 1934.

WILLIAM J. HALE, ET AL.

It is hereby certified that error appears in the printed specification of the above numbered patent requiring correction as follows: Page 4, line 109, claim 8, for "oxygen" read hydrogen; and that the said Letters Patent should be read with this correction therein that the same may conform to the record of the case in the Patent Office.

Signed and sealed this 15th day of May, A. D. 1934.

Bryan M. Battey (Seal)                                        Acting Commissioner of Patents.